United States Patent [19]

Von Kohorn et al.

[11] Patent Number: 4,594,646

[45] Date of Patent: Jun. 10, 1986

[54] LIGHT-REFLECTIVE DEVICE FOR ILLUMINATING CENTRIPETALLY VIEWED THREE-DIMENSIONAL OBJECTS

[76] Inventors: Henry Von Kohorn, 215 Rocky Rapids Rd., Stamford, Conn. 06903; David Von Kohorn, 1926 Menalto Ave., Menlo Park, Calif. 94025.

[21] Appl. No.: 660,905

[22] Filed: Oct. 15, 1984

[51] Int. Cl.⁴ ............................................. F21V 33/00
[52] U.S. Cl. .................................. 362/101; 362/122; 362/154; 362/805
[58] Field of Search ............... 362/101, 805, 254, 154, 362/122, 296

[56] References Cited

U.S. PATENT DOCUMENTS

| | | | |
|---|---|---|---|
| 1,215,986 | 2/1917 | Pohlman | 362/101 |
| 1,389,132 | 8/1921 | Galavan | 362/101 |
| 2,604,579 | 7/1952 | Deneboudes | 362/101 |
| 2,723,341 | 11/1955 | Greenspan | 362/101 |
| 3,030,735 | 4/1962 | Bodkins | 362/154 |
| 3,269,578 | 8/1966 | Lewis | 362/101 |
| 4,349,864 | 9/1982 | Smith | 362/805 |

FOREIGN PATENT DOCUMENTS 17247 of 1913 United Kingdom ................ 362/101

Primary Examiner—Ira S. Lazarus
Attorney, Agent, or Firm—Parmelee, Bollinger & Bramblett

[57] ABSTRACT

Method, devices and systems are disclosed which provide for the indirect, substantially glare-free, directional lighting of three-dimensional objects, by which artificial light is generated at a central point which is recessed, in close proximity to, and below the object to be illuminated, said light being directed downwardly against a reflective surface and then upwardly in the direction of such object in the shape of a predetermined light mantle substantially enveloping the object without significant scattering of light. Shielding means above the light source protect the eyes of observers from direct view of the light. The upwardly reflected light is centripetally and indirectly visible without glare by its reflections from the illuminated object. The disclosed arrangement of components permits multi-directional centripetal viewing, including particularly the glare-free viewing by a plurality of observers, for instance persons grouped around the illuminated object in a circle, irrespective of the direction of the light source relative to the eyes of observers.

14 Claims, 7 Drawing Figures

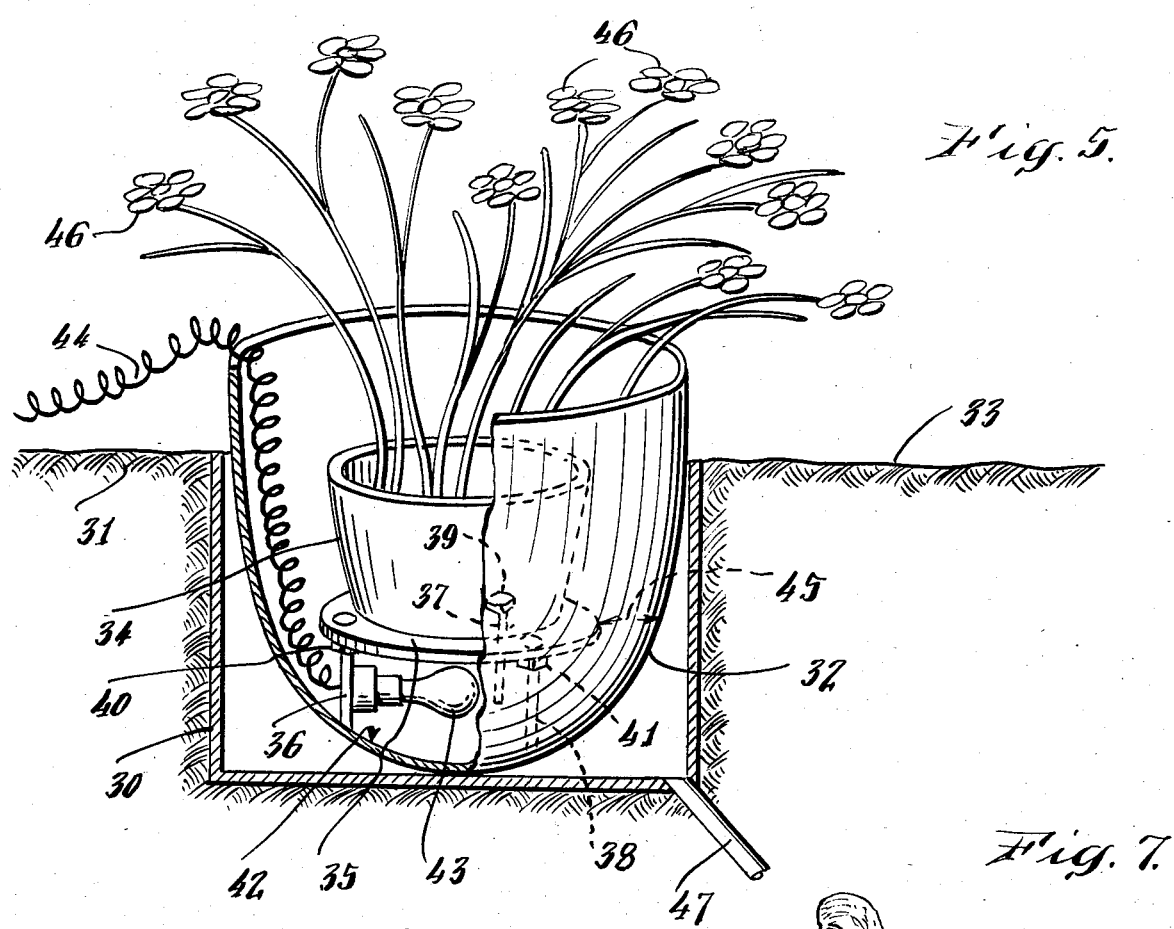
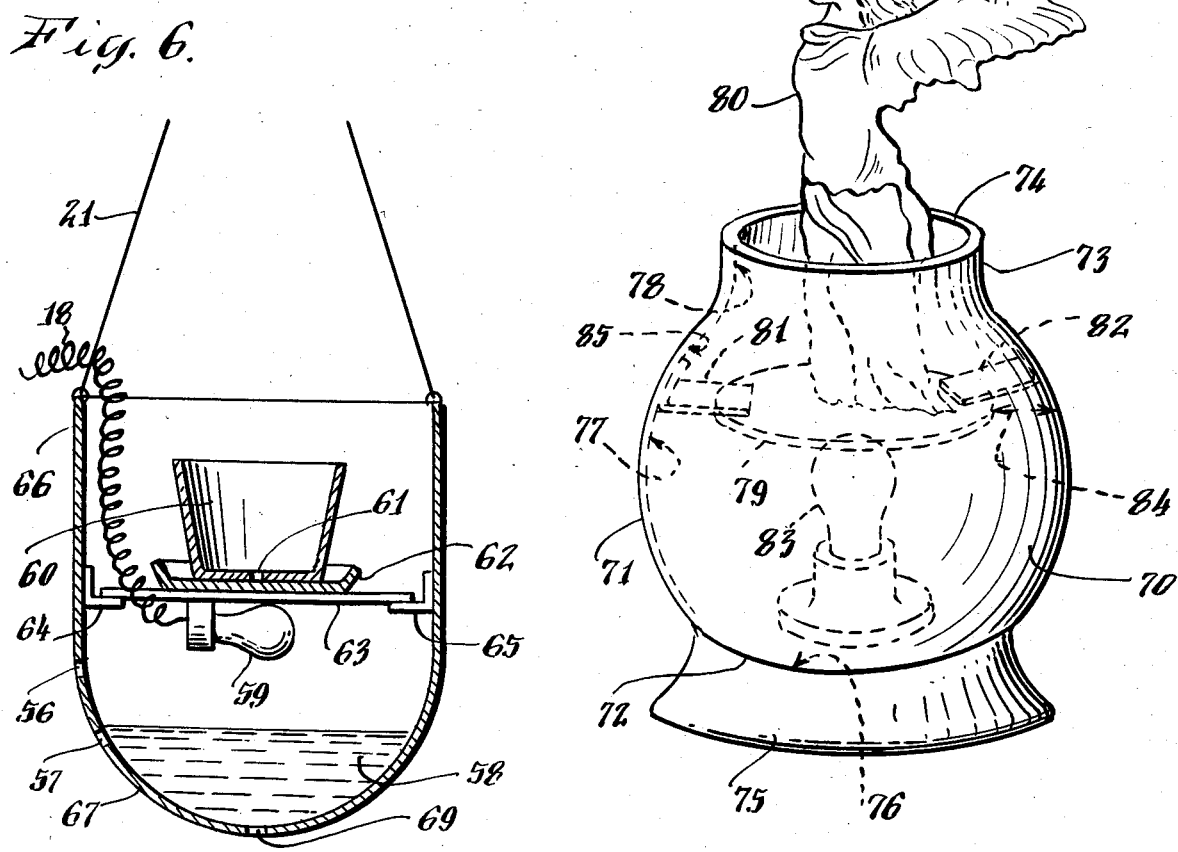

LIGHT-REFLECTIVE DEVICE FOR ILLUMINATING CENTRIPETALLY VIEWED THREE-DIMENSIONAL OBJECTS

BACKGROUND OF THE INVENTION

The present invention relates to the directional lighting of objects having thee-dimensional surfaces, such as plants, sculptures and other defined objects.

It particularly relates to the glare-free illumination of objects intended to be centripetally viewed by a plurality of observers grouped around such lighted object. Conventional methods used to light three-dimensional objects involve the use of spotlights, ceiling lights, track lights and the like, normally beamed at and around the object to be illuminated from a distance, normally of several meters. Such lighting methods and devices have a number of disadvantages. A primary disadvantage stems from the distance at which conventional lights are mounted from the object to be illuminated. This causes not only loss of lumens, but a scattering of light beyond the confines of the object. It is obvious that, the greater the distance, the more difficult it is to economically direct light with precision at three-dimensional objects, especially objects having irregular configurations. An illustration would be a tall or spindly plant or an irregularly shaped object, in the lighting of which much of the light passes by and through such an object.

A serious drawback of such lighting methods lies in the glare produced by ceiling lights and spotlights, which results in discomfort to the eyes of observers.

Glare-free lighting devices positioned in close proximity to the objects to be illuminated are known and employed in the conventional lighting of two-dimensional surfaces such as paintings, murals, wall hangings and the like. Such devices, mounted for instance at the top or bottom edge of a painting, are however, not suitable for lighting objects having three-dimensional surfaces, such as standing or hanging indoor plants, or outdoor plants, in a decorative, pleasing and effective manner. The present invention is specifically directed towards the illumination of objects having three-dimensional surfaces and does not relate to the lighting of two-dimensional, planar, or essentially flat areas, such as floors and walls, or other flat objects such as paintings and tapestries.

Lighting devices, such as spotlights, for lighting indoor and outdoor plants are used extensively in the illumination of specific three-dimensional objects. The light from such light sources, illuminating for instance the foliage of plants, normally emanates from one source or from several discrete light sources placed at a distance from the object. The disadvantages of these devices are several. First, the light originating at a single source or even at several sources, positioned at a distance and directed at a plant, illuminates only that facet of the foliage which faces such light sources, i.e. one side of the plant. Also, such light usually shines across and through the plant, which is inefficient; more importantly, the naked light shines directly into the eyes of persons facing the light source. If the illuminated plant is thick or dense enough to prevent light from shining through it in such annoying fashion, it follows that the side of the plant facing away from the light source receives no illumination at all. If, in order to overcome these drawbacks, several light sources are disposed around the object to be illuminated, the equipment cost and operating expenses are correspondingly multiplied. Furthermore, the lighting effect of such devices is not uniform and juxtapositioned persons will be exposed to glare.

The present invention therefore is intended to be useful in lighting three-dimensional objects involving multidirectional and centripetal (radially inward) viewing by juxtapositioned observers on opposite sides of the object to be illuminated, irrespective of whether the lighted object is transparent, has openings, or is irregularly shaped. Using currently available devices, the pleasing effect of lighting the foliage of plants and shrubs is destroyed when the human eye is directly exposed to the light source.

The type of outdoor lighting device commonly used, which has reflectors directing light downwardly in a glare-free manner towards the ground is capable of illuminating only flowers or short plants; whereas the present invention does not depend on the height, shape or level of the object to be illuminated.

As previously stated, whenever spotlights or similar lights are used in illuminating plants, juxtapositioned observers, i.e. observers positioned on the side of the plant opposite to that where such light source is mounted, are exposed to the unpleasant glare of directly viewed light. For these reasons, known lighting devices are unsatisfactory when objects are displayed for viewing from all sides, e.g. free standing museum exhibits. The present invention addresses problems of this nature, as for instance lighting a sculpture in such fashion that observers grouped in a circle around the exhibit will each have an unobstructed, glare-free view of the uniformly lighted sculpture, or even of a sculpture having selected individual features lighted differently from the rest.

It therefore is a principal object of the invention to directionally illuminate three-dimensional objects, such as plants and sculptures positioned above, at, or below the eye level of observers in such a manner that the source of light is not directly visible and glare is avoided.

It is another object to minimize the loss and consumption of lumens by placing the light source in close proximity to the object to be illuminated so as to shorten to the absolute practical minimum the indirect path the light has to travel in illuminating the object.

It is still another object of the invention to avoid the scattering of light inherent in other indirect lighting methods.

It is yet another object to provide an illuminating system and luminaire which are economical and simple to manufacture, install and maintain, and which are highly efficient in operation.

It is another object of the present invention to provide means for supplying to tropical and other plants heated, moist vapor in a sustained manner while illuminating the plant.

It is still another object to indirectly light three-dimensional objects in a novel, decorative and pleasing manner.

Definitions

As stated, the avoidance of glare is a primary object and result of the methods, systems and devices described herein. The Encyclopaedia Britannica published in 1956 defines glare as follows:

"When brightness becomes irritating it is recognized as "glare." Glare contributes more to the poor quality of a lighting system than any other factor. Glare may depend upon several conditions present in the lighting system: (1) high brightness of the source; (2) high brightness contrast between the source and the background; (3) location of the source in the field of view; (4) the total volume of the light entering the eye; and (5) the time of exposure to the brightness source. The correction of any one of these contributing factors becomes simple when it is considered individually. Because of the injurious effect of glare, either direct as from a source, or reflected from some object which reflects a specular image, bare lamps exposed in any plane should never be used. It is of prime importance that all forms of glare be controlled properly."

The term "source of light" as used herein is intended to include where appropriate a combination of more than one lamp positioned at a lighting hub or arranged in such manner as to function as a central light source emitting light in essentially centrifugal directions. The term "light mantle" as used herein denotes a wall or band of light of predetermined width and configuration. The term "object" in the phrase "object to be illuminated" is intended to include, where appropriate, the holder or support for sculptures, or associated elements of such objects as for instance the flower pot of a plant. The term "reflective" as used hereinafter is defined as "light-reflective". The term "bowl-shaped" or "dished" is intended to refer to concave structures, such as vessels having an approximately parabolic, elipsoid or hemispheric configuration at their bottom, irrespective of the configuration of the rest of the wall surface between the bottom and the rim of the vessel.

The various objects and advantages of the invention will become apparent from the following description and accompanying drawings. While the description and drawings are for illustrative purposes primarily directed to plants, it should be obvious that the methods, devices and systems claimed are equally suitable for and applicable in the illumination of other objects, such as sculptures, antiques, statues, art objects, mineral exhibits, theatrical devices, stage props, museum and show pieces of any nature.

SUMMARY OF THE INVENTION

The present invention may be summarized as being directed to methods, devices and systems for the indirect, substantially glare-free, directional lighting of three-dimensional objects, by which artificial light is generated at a central point which is recessed, disposed below and in close proximity to the object to be illuminated.

Light shining downwardly is reflected upwardly towards such object in the shape of a predetermined light mantle substantially enveloping the object without significant scattering of light. Shielding means above the light source protect the eyes of observers from direct view of the light. The upwardly reflected light is centripetally and indirectly visible essentially only by its reflections from the illuminated object. The novel arrangement of components according to the present invention thus permits multi-directional, centripetal viewing, including particularly the glare-free viewing by a plurality of observers, for instance persons grouped around the illuminated object in a circle, irrespective of the level of the light source relative to the eyes of observers.

The lighting method and devices of the present invention drastically reduce electric power requirements by reducing the distance between the light source and the objects to be illuminated to the practical minimum. Except for internal distances in the receptacle containing the light source, including the support means for the object to be illuminated, such as a shelf, and shielding means, which may be the same or a separate shelf, the light source is proximate to said object. This arrangement reduces the light path in virtually all instances to substantially less than one meter. In most cases, the light will travel no more than 20-50 centimeters to reach the object. The devices described are suitable for the lighting of such objects as natural and artificial plants, sculptures and other free-standing objects. In the case of natural plants, means for the protection of the light source against water are provided.

Because it is an essential feature of the present invention to have the light source positioned below and in close proximity to the lighted object, the invention may be divided into two primary fields of application. One field comprises the use of devices in the presence of water, necessitating water-proof lighting fixtures, such as for natural plants requiring watering. The other field comprises the use of devices not needing water-proof fixtures, such as for the illumination of artificial plants, sculptures and the like.

BRIEF DESCRIPTION OF DRAWINGS

FIG. 5 is a partially broken away view of a system for lighting a plant in a receptacle positioned partially below ground level.

FIG. 6 is a diagramatic cross-section of the device adapted to provide warm water vapor to plants.

FIG. 7 is a diagramatic cross-section of an embodiment of the device for particular use in the illumination of sculptures.

DETAILED DESCRIPTION OF THE INVENTION AND DRAWINGS

Figure 1:
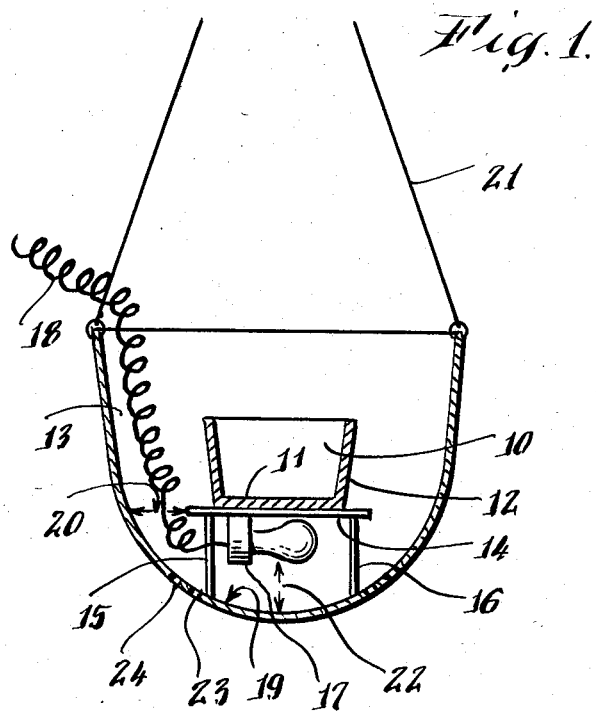
FIG. 1 is a diagramatic cross-section of the device employed for lighting a plant in a suspended container.

The device shown in FIG. 1 in diagramatic cross-section, comprises receptacle 10 for a hanging plant having bottom 11 and wall 12. Receptacle 10 itself may contain a plant (not shown) or it may hold an inner plant receptacle, such as a conventional flower pot. If an inner plant receptacle is used, wall 12 may only consist of a retaining wall for the inner receptacle or flower pot 10.

Disposed below receptacle 10 is an outer structure or receptacle 13, in this instance a dished bowl or shell, the concave surface of which faces upwardly and has such configuration that receptacle 10 is at least partially recessed in it. The horizontal inside dimensions of the outer structure or receptacle 13 are greater than the horizontal outside dimensions of receptacle 10, creating a space 20 between the inside of shell 13 and the outside of receptacle 10. If the top plan view cross-sections of shell 13 and receptacle 10 are both circular, the cross-section of said spacing 20 is annular. The inside surface of shell 13 has a reflective portion, which normally comprises at least the bottom portion 19, although additional lower wall portions of the inside of shell 13 may be reflective.

The configuration at the closed end of the dished bowl 13 is adapted to aid reflection and can, for instance, be parabolic, elipsoid or hemispheric. The wall near the open end of the bowl 13 can be cylindrical.

Receptacle 10 rests on support 14 which may be a shelf held in place by positioning means, such as legs 15 and 16. Two of the four legs of an embodiment of the device are shown. The device may have three or more legs. The legs may be adjustable in height so as to be able to selectively adjust the height of support 14 and with it the spacing 20 between receptacle 10 and the dished wall portion of shell 13. An incandescent light source 17 having connecting cable 18 is mounted below support 14. Light source 17 is mounted in spaced relationship to all inside surfaces of receptacle 13.

Support 14 may be a shelf dimensioned so as to permit a light beam of desired wall configuration to pass through the space between it and shell 13. The light beam may have an annular or other shape. Support or shelf 14 can serve solely as a shielding or guide means to force the light to escape through said space, or it can additionally be provided with a reflective bottom surface. Light source 17 may be disposed only directly below said support 14, or it may laterally protrude from it.

The device as shown permits using the bottom portion 19 as a water reservoir, but without necessitating a water-tight light source at much greater cost than an ordinary light source. By mounting light source 17 under the support 14 and directly underneath the illuminated object, in spaced relationship to bottom portion 19, a catch basin is created and the size of said catch basin may be adjusted by raising or lowering support 14 on legs 15 and 16. In this or similar manner, the position of light source 17 may be adjusted, so as to keep it above the level of water accumulating at the bottom portion 19 and preventing short circuits.

As an additional emergency provision, drainage holes 23 and 24 may be provided in the wall of shell 13. Such drainage holes, provided at different levels, may selectively be closed or opened depending on the position of the light source 17, and prevent the water in said catch basin from rising to the level of light source 17.

A separate shelf with a reflective underside may be provided below support 14, so as to reflect light from light source 17 downwardly against the reflective inside shell surface 19. Such reflective surfaces may be created for instance by applying a white paint or metallic coating.

The positioning means such as legs 15 and 16 are adapted to permit the light from light source 17 to horizontally pass between them. Some of the rays of light from light source 17 will be reflected several times upwardly and downwardly until they escape from the bottom portion of shell 13 along its wall toward the upper rim of shell 13 through spacing 20. The horizontal dimensions of support or shelf 14 may be smaller, the same, or greater than those of the bottom 11 of the receptacle 10. If support 14 protrudes horizontally beyond bottom 11, it narrows spacing 20 accordingly.

The embodiment shown in FIG. 1 further comprises suspension means, such as rope or chains 21 for hanging the device from the ceiling or a wall bracket. Other forms of positioning the plant illuminating device may be devised.

Irrespective of the position of the device relative to the eye level of observers, the light escaping from the device through spacing 20 in an upward direction in the form of a light mantle makes the plant visible by the reflections from its foliage, but is not directly visible. An observer positioned outside an imaginary wall extending upward from the upper rim of shell 13 will not be exposed to the direct view of the light emanating from shell 13 and such light will be visible to observers only by its reflections from the plant.

By giving the shell 13 and the plant receptacle 10 appropriate configurations, as further described hereinafter, the light escaping through spacing 20 may also be controlled with respect to its amount and direction. The light mantle which may be cylindrical or conical, may also be controlled with respect to its dispersion and its area of illumination. Control of direction and of the illuminated area are important in that it makes the device practical both for overhanging plants requiring a wide, outwardly flaring light mantle and for plants not laterally extending beyond the rim of the container, requiring a vertical or even upwardly converging light mantle. As an important result, the said controls prevent wasteful scattering of light. This, in turn, permits the use of smaller lamps and a more efficient use of the wattage brought to bear.

Incandescent, fluorescent or other types of lamps may be used in practicing the present invention. Included among both types are lamps generating light on plant growth promoting wave length.

The direction and shape of the light beams emanating from the device may be controlled by giving the rim of the outer shell 13 the desired configuration. For instance, if a wider dispersion of the light is desired, the upper portions of the walls of receptacles 10 and 13 are adapted to flare outwardly.

The amount of light and the shape of the areas illuminated can also be adjusted by controlling the width and configuration of spacing 20. For instance, space 20 may be narrowed; it may be scallopped, irregularly configured or completely closed in part, with corresponding predetermined effects on the illumination of the plant or other object.

Spacing 20 accordingly can be shaped to achieve the desired effect by selecting one of a number of different removable support shelves 14 having appropriate dimensions and outer configurations.

When the device described in some of its embodiments is used in places where it would be impractical or ungainly to string electric cables to an outside power source, battery-powered light sources may be substituted for those supplied by an electric utility.

According to still another preferred embodiment of the invention, the dished bottom of the bowl serving as a reflector is shaped similarly to certain cake forms, sometimes referred to as "angel cake pans" or "bundt cake pans" having an annular depression or cavity around a central opening or protrusion. The ring-like cavity ensures the radially outward reflection of the light. The light source is mounted in the center of and above such reflector. It should be clear, however, that in all embodiments of the present invention, the light source is essentially proximate to the object to be lighted.

According to another embodiment of the invention, the object is illuminated in a selected color or colors other than that of the light source. For instance, a ring-shaped sheet is provided between the reflector bowl and the object, said sheet consisting of a self-supporting, translucent, plastic film of desired color. The film ring rests on the rim or on the wall of the reflector bowl and extends partially and sufficiently toward the center of said bowl so as to act as a filter for the light reflected upwardly along the wall of the bowl, but without interfering with the light shining downwardly into the reflector bowl from the light source.

It is obvious that, while the cross-section of the dished outer structure or bowl 13 having a reflective bottom will be circular in many instances, a square or other configuration may be utilized, provided most of the light is reflected upwardly along the inner walls of said structure.

The diameter and configuration of shelf or support 14 and of such additional shelves as may be provided above said support 14 are chosen so that support 14, or any other or additional shelves extend horizontally beyond the confines of the light source 17. This ensures that light from said light source cannot escape directly upwardly and is not directly visible to any observers. Said support shelf 14 or additional shelves therefore can act as shielding means in protecting the eyes of observers from glare. If no flower pot is needed, the object to be illuminated may rest on support shelf 14. The outer bottom surface of receptacle 10 preferably is reflective. The rest of the outer surface of receptacle 10 and the upper inside wall portions of shell 13 may be provided with a dark, non-reflective coating or may be covered with a light-absorbing material, such as a dark pile fabric, to further protect the eyes of observers from glare.

The upwardly reflected light, whether in the predetermined shape of a cylindrical, spreading or conically converging light mantle, substantially envelops the object from all sides, although it does not strike the top or bottom thereof. However, the illumination of laterally exposed surfaces of the object is all that is desired in most instances, particularly in the case of plants.

According to another preferred embodiment, the wall of shell 13 protrudes vertically above the upper reaches of receptacle 10, such as a flower pot. This further ensures shielding of observers' eyes even from the slight indirect reflections of light from the dark outer surface of the flower pot.

Normally, observers are not positioned so close to a plant as to look straight down into a flower pot or other container of the object to be illuminated. The present invention makes it possible to shield from glare the eyes of all observers positioned outside an area above the device approximately defined by an imaginary wall extending vertically upwardly from the outer walls of the device; in practice this includes virtually all persons viewing the illuminated object, even if such a group of observers completely encircles such object, as most will be positioned outside said area.

The following example further illustrates the novel uses of the glare-free devices described, in this instance in connection with a table, such as a dining table, having a flower arrangement as its centerpiece. In this embodiment, a removable raised structure is placed on such table. The structure may take the form of a box of desired dimensions. An opening is provided in, and near the center of, the board which forms the upper surface of the raised structure. Said opening is large enough to accommodate a device of the type described. The device is inserted in said hole and supported in recessed position in a hanging manner or resting on the bottom wall of the box or directly on the table. The wall and rim of the flower pot disposed in said device, or only the flowers, protrude upwardly through said opening above the surface of the raised structure.

Electric connecting means from the source of power supply to the device are disposed and conceiled below said board forming the upper surface of the raised structure. When preferred, a battery is provided inside said raised structure or below the table. A switch for the light source may be mounted on the outside of said structure.

Due to the recessed position of the light source and the doubly reflected nature of the light, the persons sitting around the table see only the reflections of the indirect light from the flowers and do not see the light emanating from the device directly, even though they may be sitting within 50 centimeters or less of the flowers. This effect may also be achieved by providing the opening for the device directly in the table itself, the device being suspended from or supported by a table member.

Figure 2:
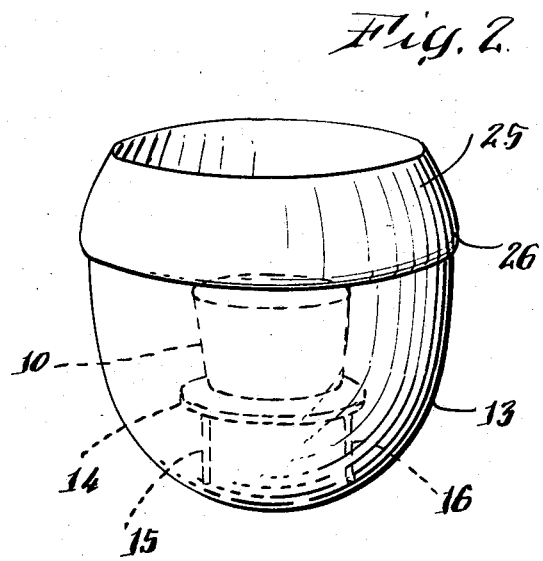
FIG. 2 depicts in diagramatic cross-section a deflector used to redirect upwardly reflected light towards the object to be illuminated and adapted to be mounted on the device employed.

FIG. 2 depicts an inwardly flaring annular deflector 25 adapted to be removably positioned on the upper rim of shell 13 of the device of FIG. 1 or similar devices. Deflector 25 has the shpae of an inverted, truncated, dished bowl section having curved wall 26, the inside surface of which is reflective and concentrates the light directed upwardly from the device shown in FIG. 1 in such a manner as to give it the shape of an upwardly converging light mantle.

A deflector, such as deflector 25 and variations of it, is particularly useful in the effective and attractive lighting of irregular-shaped objects, such as sculptures or statues having indentations and protrusions, some of which are to be highlighted, while others are preferred to be de-emphasized in their lighting. Such effects are achieved (a) by pre-determining the areas, i.e. the parts of the sculpture to be illuminated and/or (b) by predetermining the amount of light to be directed at said parts.

This technique of controlling the illumination produces very subtle and distinctive effects, such as in the case of statues or sculptures having prominent parts towards which the attention of viewers is to be directed. When a device of the types described herein is permanently dedicated to one object, such as a museum piece, the said deflector can be an integral part of the outer container of the object, the rim and upper wall portions of said container having the above described features of the deflector.

Another embodiment of such a deflector used in a system to illuminate indoor or outdoor statues comprises for instance a 60 degree sector of the annular ring with a more pronounced inward flare, thus concentrating the light in a more narrow beam or mantle directed at the desired part of the statue. Another sector of the deflector ring can be provided with a dark or less reflective coating on the inner surface of the deflector, in order to tone down the lighting effect on other surfaces of the statue.

Either some or all of said features may be provided and can be part of a separate deflector or incorporated into the upper wall and rim portions of an outer container for the object. Other embodiments will occur to persons skilled in the art.

Figure 3:
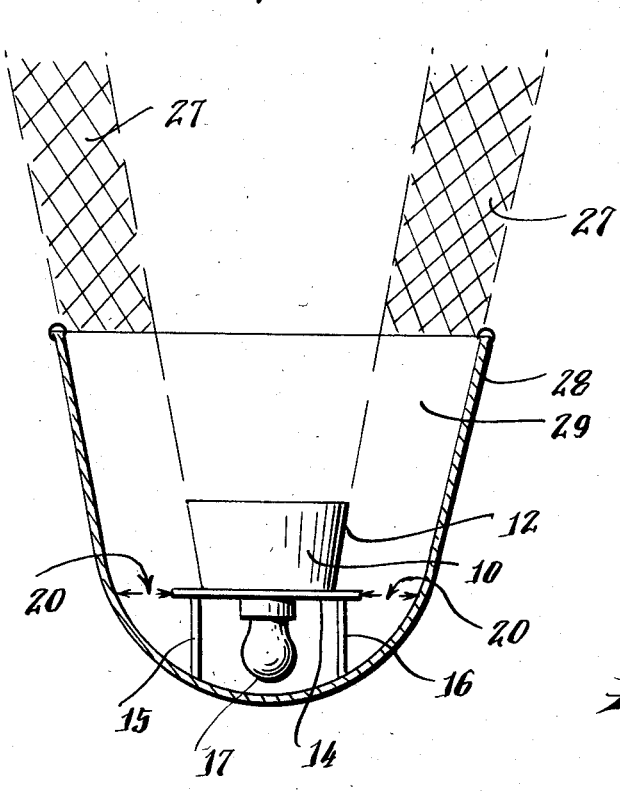
FIG. 3 is a diagramatic cross-section of the device adapted to illuminate a plant having widely spread foliage by directing a spreading light mantle at it.

FIG. 3 is a cross-sectional, diagramatic view of an embodiment of the device used to produce an outwardly directed light mantle 27 used to illuminate wide objects, such as bushy or overhanging plants (not shown). The upper portion 28 of the wall of structure or container 29 are given an outwardly flaring configuration, resulting in an outwardly flaring light mantle between the wall 12 of container 10 and wall portion 28 of container 29. Support 14 for container 10 and incandescent light source 17 rests on three adjustable legs, of which legs 15 and 16 are shown.

Decorative effects can be created by providing openings of predetermined shape in structure of container 29 permitting light to escape in the desired amount and shape. Also in this manner parts of the object extending beyond the upper rim of said structure 29, or other ambient objects may be illuminated. In the case of plants having overhanging foliage extending below the rim of the outer structure 29, a translucent window may be provided in said container. In this manner, unusual and pleasing lighting effects of the leaves can be obtained.

Figure 4:
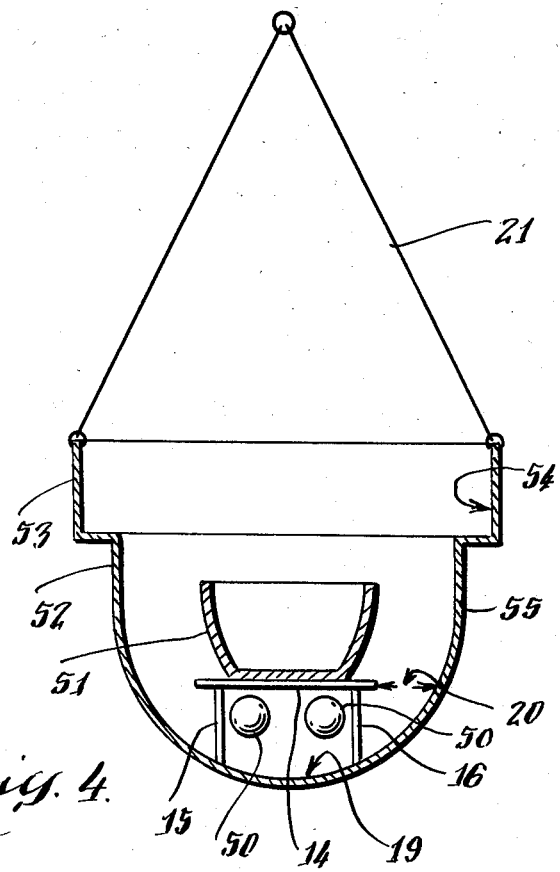
FIG. 4 is a diagramatic cross-section of another embodiment of the device for lighting a plant, in which the outer receptacle has set back, upper wall portions.

FIG. 4 is a cross-sectional, diagramatic view of another embodiment of the device having a circular, fluorescent lamp 50 disposed below shelf 14, which serves as a support for inner structure 51. Shelf 14 has a reflective bottom surface and also serves as shielding or screening means preventing the light from escaping from the device directly upwardly and directing it downwardly towards reflective inner surface portion 19 near the bottom of round structure 52. The inner surface 54 of upper wall portions 53 of outer structure 52 is dark in color and substantially non-light reflective. The upper wall portion 53 near the rim of structure 52 is set back outwardly from lower wall portion 55. This configuration prevents light reflected upwardly by bottom surface 19 from impinging on the inner surface 54 of the set back wall portion 53, thus further protecting the eyes of observers from undesirable reflections or glare.

FIG. 5 depicts in partly broken away form an indirect lighting system, in which a third concave structure in the form of cavity 30 has been provided in ground 31. Said system is preferred for outdoor installation, but is also suitable indoors. Cavity 30 may have inside walls comprised for instance of soil, wood, metal, plastic, or concrete. The outer structure or receptacle 32 is positioned in cavity 30. It may partially protrude from upper ground level 33 or may be entirely below ground level. Inner receptacle 34 rests on support 35, which is held in a predetermined position by adjustable legs 36, 37 and 38. Said legs may consist of standard threaded bolts or other fasteners. Shelf 35 has corresponding holes for said legs, and is held at the desired height by nuts 39, 40 and 41 or other devices. Inner receptacle 34 is fully recessed in outer receptacle 32, so that the upper rim of receptacle 32 protrudes above the upper rim of the inner receptacle 34.

Light source 43, comprising a lamp and associated fixture, is mounted on the underside of shelf 35. For outdoor use, the light source is of water-proof or drip-proof construction. Shelf 35 has a predetermined diameter selected so as to create the desired width of spacing 45. Electric current is provided from outside generating sources through wire connection 44, but may be provided by batteries.

For outdoor use, all electric power supply and related connecting means are of water-proof design. The underside of shelf 35 may be light-reflective. Light-reflective surfaces are provided along the inner surface of bottom portion 42 of outer structure 32.

The light directed downwardly by the lamp 43 and, when reflective, by the underside of shelf 35, and redirected upwardly by reflective bottom portion 42, can escape only through spacing 45 between outer receptacle 32 and shelf 35. If spacing 45 is to be narrowed, shelf 35 may have resting on it a removable second shelf having a larger diameter than shelf 35 and having a reflective underside. Alternative shelves with different diameters and outside configurations may be placed on shelf 35 depending on the desired light effect to be created by the mantle of light reflected upwardly towards the object to be illuminated, in this instance plant 46. Cavity 30 is provided with drain or outlet 47 to allow rain water or excess water accumulated in the watering of plants to drain through outlet 47. It is understood of course that, where indicated, lighting fixtures suitable for use in wet locations may be used. Reflective surfaces are rust-resistant.

Normally the reflective portion 42 of the outer structure 32 is positioned so that the light is reflected upwardly in an evenly distributed manner, i.e. uniformly reflected around the rim of the inner plant receptacle. In such instances the light mantle substantially enfolds the peripheral confines of the plant. However, in the case of hanging plants which are draped over the rim of receptacles 34 and 32 and are visible on one side of the structure 32, or in the case of sculptures having portions to be highlighted, the said reflector means may be adapted so as to concentrate the reflected light on the portion of the plant or sculpture to be especially illuminated.

The devices described herein may be used as night lights or to provide subdued illumination when this is desirable in homes and in public places.

In another embodiment of the invention, a light sensor is provided between the power source and the lamp, adapted to activate the light source at dusk and de-activate it at dawn. The device having an appropriate timer, wherein the lamp aids plant growth, can provide such radiant energy to the plant at predetermined times in the absence of the occupants of the premises.

The device illustrated in FIG. 6 is adapted to provide moist heated vapor to plants, such as tropical plants, thriving in a humid, hot ambient atmosphere, as for instance orchids. Light source 59 is of appropriate design for use in wet locations. An incandescent or high-intensity lamp is employed as a dual source of radiant energy, i.e. of light as well as heat, in order to generate sufficient heat, along with light, to evaporate water. In the device illustrated, water 58, as well as the reflective inner surface of bottom portion 67 of container 66, reflect light upwardly. Bottom portion 67 is a water reservoir.

Brackets 64 and 65, and crossbars 63 serving as support for the plant are sufficiently narrow to allow most of the light from light source 59 to escape upwardly between saucer 62 and the inner surface of container 66. The heated moist vapor rises from said water reservoir in the direction of the plant (not shown) at a rate predetermined by the heat given off by said dual purpose lamp, and, where desirable, by an additional separate heating element (not shown) provided in the bottom portion 67 of container 66. This can be a conventional immersion heater with a timer and temperature controls.

Crossbars 63 forming an open grid, and brackets 64 and 65 are rust-resisting and configured so as to permit moist vapor to rise to the plant in flower pot 60 having drainage hole 61. Closable drains 56, 57 and 69 control the level of the water 58 in bottom portion 67 of container 66. When required, water is introduced into container 66 by conventional means. The method described thus permits sustained vaporization by providing a large enough volume of water in said reservoir.

The outer container 66 serves to contain the air in the space surrounding the plant and to prevent the rising vapor or air from dissipating prematurely. Thus, the arrangement described makes it possible to generate and conduct heat to plants, the lower portions of which are surrounded and sheathed by container 66. The warm vapor rising from the device envelops and protects the plant and permits, for instance, the growing of delicate or sub-tropical flowers and plants outdoors in inclement climates.

In a modification of the device of FIG. 6, a perforated, upwardly light-reflective shelf or layer is provided above the level of water 58. This shelf reflects the light from light source 59 upwardly without impairing the upward flow of heated water vapor from the lower portion of container 66. Said layer may consist of a perforated film, coated or treated to make it reflective on its upper surface and adapted to float on the water in said reservoir. The perforations allow the vapor to rise.

Similarly, without water being present, a heater may be provided near the bottom of container 66 to heat the ambient air, causing dry, heated air to rise past the plant. This embodiment is used when the plant thrives in a hot, dry climate.

The above described methods and devices are useful indoors, as well as outdoors, as each device can serve as an individual, small hothouse or greenhouse. To attain this objective, the upper wall portions of container 66 preferably are configured so that the rising air or vapor tightly envelops the plant.

As described hereinabove, in devices and systems incorporating the novel arrangement of the present invention, the light source is disposed in the device in recessed position, in close proximity to and below the object to be illuminated. Obviously, the distance the light has to travel is to some extent affected by the height of the illuminated object. In any event, however, the combination of the above enumerated features reduces the path of the indirect light from the light source to the object to the absolute minimum. This arrangement results in significantly reduced scattering and waste of light and in significantly reduced wattage requirements by focusing the light on the object to be illuminated from a close distance in a highly efficient manner. It should be clear that the dispersion of light in the direction of the lighted object as described herein, is intentional and not to be confused with any involuntary scattering of light between the light source and the object inherent in conventional methods.

This ability to direct low wattage light, for instance in the illumination of plants, primarily at the plant foliage from a close distance without the distraction and discomfort of glare permits a novel, attractive and much more economical lighting effect. For plants 45 centimeters high, with a diameter of 30 centimeters, a 15 watt incandescent lamp has proven entirely adequate. A 20 watt circular fluorescent lamp will provide ample light for a plant with a height and width of 60 centimeters. Particularly bushy plants, which ordinarily would require several spotlights positioned at different angles with attendant glare, can be lighted in a most attractive and glare-free manner by a single central light source arranged as hereinbefore described. If more powerful lamps are used, the light reflected by the illuminated object can even produce an intimate lighting effect throughout the ambient space without additional room lighting and without any glare. When the devices described are used in unprotected outdoor locations, the light source and electrical connections are of waterproof construction; reflective surfaces are rust-resisting; and water drainage means are provided for all receptacles or related structures.

The object to be illuminated can be lighted in an essentially vertically upward direction, which method produces highly decorative results in the case of plants. When it is desired to illuminate more than the outer confines of an object, such as a sculpture, the use of a deflector as shown in FIG. 2, or of an outer receptacle capable of deflecting the light radially inwardly is preferred. Such a receptacle is shown in FIG. 7.

Receptacle 70 of FIG. 7 comprises curved wall portion 71, bottom portion 72, neck 73 and rim 74. Base 75 of receptacle 70 has a flat bottom surface and is deep enough to accommodate the curvature of inside bottom portion 72. Curved wall portion 71 converges towards the top.

The inside surface 76 of bottom portion 72 and the inside surface 77 of wall portion 71 are light-reflective. They may be covered with a white reflective or metallic coating. The inside surfaces 78 of neck 73 and rim 74 are dark in color and are non-light reflective. They may be covered with a dull, black, textured material, such as a pile fabric. Neck 73 is substantially vertical.

Shelf 79 supports sculpture 80, protruding from rim 74. It is held in place by brackets 81 and 82 shown, being two of three or more brackets or other fastening or holding devices. By providing appropriate fastening or holding devices, shelf 79 can be removably held in place at the desired level.

Light source 83 rests on bottom portion 72, but may be otherwise supported at the desired level.

The underside of shelf 79 may be light-reflective. In that event it is not necessary to provide separate shielding means between the light source 83 and the object, i.e. the sculpture 80. The light generated by light source 83 can escape from receptacle 70 only through spacing 84 between shelf 79 and wall portion 71.

When illuminating for instance sculptures, the diameters of receptacle 70 at wall portion 71, as well as at neck 73 and rim 74 are dimensioned comparatively large in relation to the object to be illuminated. In addition, the curvature of wall portion 71 is chosen so that the light escaping through neck 73 and rim 74 forms an angle of at least ten degrees with the vertical plane. When desired, such angle can be thirty degrees or more. The light shining radially inwardly therefore penetrates into the broken, curved and relief surfaces of the sculpture, which greatly reduces the contrast of highlights and shadows of the lighted object. The light does not scatter and is concentrated towards the object. If a very pronounced inward deflection of the light mantle is desired, an outer structure having a configuration resembling a truncated sphere may be used. Provided the diameter of the neck and rim provided at the upper portion of said truncated sphere are large enough, even relatively large objects such as sculptures may be lighted in a radially inward direction.

The methods and devices described permit improved lighting, particularly of sculptures and other show pieces, in that, according to the present invention, the light (1) is produced by a recessed light source disposed below and proximate to the object to be illuminated in such a manner as to be directly invisible to observers, irrespective of their position around the object, thus avoiding glare, (2) is directed upwardly and inwardly towards the object at predetermined angles in a tightly enveloping manner without wasteful scattering, and (3) can be caused to centripetally strike the object, irrespective of its width, by dimensioning the device so that the light generated by a central light source is projected from points outside the confines of the object.

In the practice of the present invention, water is present under two circumstances, i.e. in the illumination of natural plants requiring watering, with the attendent danger of overwatering, and of outdoor objects exposed to rain. In these applications, water-proof lighting fixtures and rust-proof components are used. It will therefore readily be appreciated that devices designed for the field of use obviating these requirements, i.e. in the illumination of artificial plants and other indoor objects, are much simpler and cheaper.

In co-pending application Ser. No. 660,906, entitled "Light-conductive Device for Illuminating Centripetally Viewed Three-dimensional Objects", devices are disclosed having a recessed light source in close proximity to and below the object to be illuminated. The invention described in above identified application differs from the present invention in important respects and specifically in that—according to said co-pending application—the light is generated in a light chamber below the object and is conducted upwardly by and through the mass of light-conductive members. These members have light-receiving optical interfaces with said light chamber and are adapted to emit light at their upper ends, directing it towards the object to be illuminated.

In contrast, the light generated below the object in accordance with the present invention is first directed downwardly by shielding means against the reflective, inside bottom surface of a receptacle for the object, which surface in turn reflects the light upwardly towards the object in the shape of a light mantle or light wall produced by the light escaping through a spacing between said shielding means and the inner wall surface of said receptacle. Whereas the invention described in the above identified copending application is not dependent on a reflective bottom below the light source, it is an integral and indispensible feature of the present invention to re-direct downwardly-directed light from a reflective inside surface of the bottom portion of an outer receptacle.

The light source disposed in close proximity to the object to be illuminated may comprise a single lamp or may comprise a plurality of light sources functioning as a group. When the light source comprises only one lamp, it is normally positioned directly, i.e. vertically below the object. When the light source comprises a group of lamps, these may be positioned directly below the object, or they may be positioned in close proximity to and encircling the bottom or foot end of the object.

The choice of the device is to some extent affected by the size of the object to be illuminated. In all instances, however, the principal objective of the arrangement is to avoid glare and even the direct view of light reflected from surfaces other than the object to be illuminated. The said arrangement of separate, but grouped lamps encircling the lower portion of an object is particularly suitable when it is desired to illuminate large objects, such as trees, statues and the like, which, respectively, do not readily permit providing the space for a light source vertically below their trunk, foundation and the like. If, for purposes of illustration, it is desired to illuminate a statue, four or more devices of the type described may be grouped at or below ground level around the foot of the statue in substantially encircling fashion, avoiding glare irrespective of the position of observers.

Four of the devices or systems described for use in wet locations may be provided. Each of the devices supports a plant or a small sculpture in a container. The light mantle of each device is configured so that it illuminates the confines of the plant or sculpture supported by it and converges near the top of the statue. The four said light mantles either converge near the top of the statue or are used to particularly illuminate a predetermined part of the statue, producing an attractive and glare-free lighting effect on the statue, as well as on the four said plants or sculptures.

Other applications, embodiments and configurations of the present invention may be devised by persons skilled in the art without deviating from the principal features described herein and these are intended to be included within the scope of the appended claims.

What is claimed is:

1. An illuminating device for indirectly illuminating three-dimensional objects for substantially glar-free centripetally viewing comprising:
   an open receptacle for supporting an object which is to be illuminated and viewed therein,
   said receptacle having a reflective bottom surface and upwardly extending side walls substantially surrounding at least a lower portion of the object to be illuminated in said receptacle,
   a shielding means in the form of a shelf mounted in said receptacle and spaced from said side walls and said reflective bottom surface of said receptacle, said shelf supporting the object to be illuminated in said receptacle,
   a reflective surface on the undersurface of said shelf,
   a light source mounted in said receptacle under said shelf in close proximity to an object to be indirectly illuminated thereby and in spaced relationship to said reflective bottom and said side walls whereby light from said source is reflected by the undersurface of said shelf and the bottom surface of said receptacle and directed upward surrounding said object thereby indirectly illuminating an object positioned on said shelf which totally obscures said source from a viewer.

2. The device of claim 1 for use in illuminating plants, in which said light source generates light waves on a plant growth promoting frequency.

3. The device of claim 1 wherein the direction of the upwardly reflected light and the area of illumination are further controlled through the use of a deflector removably mounted on the upper rim of said structure, said deflector comprising an annular section of an inverted, truncated, dished bowl having a curved wall flaring inwardly towards its upper rim.

4. The device of claim 3, wherein said deflector is further characterized by a plurality of inwardly flaring surface portions
   a. producing different angles of inward deflection of the upwardly reflected light, and/or
   b. having fully reflective and less-than-fully reflective surfaces,
so as to direct predetermined amounts of light to different, predetermined surfaces of the object to be illuminated.

5. The device of claim 1, wherein the object to be illuminated comprises a plant supported by a plant container.

6. The device of claim 5, wherein therim of said receptacle protrudes above said plant container.

7. The device of claim 1, wherein the upper, inner wall surface portion and the rim of said receptacle are outwardly flared or set back from the lower, inner wall and bottom portions.

8. An illuminating system for three-dimensional objects positioned outdoors near or below ground level intended to be centripetally viewed by observes positioned at ground level, comprising
   a. the device of claim 1, having a water-proof electric light source and connecting means,
   b. a concave structure disposed at least partially below ground level, adapted to have said receptacle disposed therein in at least partially recessed position, and
   c. means to drain water from said receptacle and said concave structure.

9. The illuminating device as claimed in claim 1 having a plurality of light sources arranged under the shelf containing the object to be illuminated for essentially encirclling the object with indirect illumination.

10. The illuminating devices as claimed in claim 1 wherein upwardly extending side walls converge toward the top of said receptacle such that light escaping from said receptacle forms an angle of not less than 10 to 30 degrees to a vertical plane passing through said receptacle,
   and said side walls terminate in a substantially vertical neck forming the top of said open receptacle.

11. The illuminating device as claimed in claim 1 positioned in a recessed cavity, said cavity having an opening through which said receptacle protrudes.

12. The illuminating device as claimed in claim 1 wherein said receptacle comprises a reservoir for holding a volume of water below said source which is evaporated by said source, the resulting vapor being applied to and around said object which is a plant of the type which requires a humid ambient atmosphere.

13. A method for indirect illumination of three-dimensional object for glare-free centripetal viewing thereof comprising the steps of:
   supporting the object to be indirectly illuminated on a shelf having a reflective undersurface,
   surrounding the shelf supporting the object with an open receptacle having reflective bottom and side walls with at least the lower portions of the side walls reflecting light,
   mounting a light source below said shelf and spacing said source from said bottom and said side walls and in close proximity and under said object,
   reflecting light from the undersurface of said shelf and from said bottom of said receptacle,
   directing said reflected light upwardly to envelop the object thereby illuminating the outer reaches of the object,
   reflecting light from the surface of the object thereby providing a centripetally visible object without glare to viewers surrounding the object.

14. The method as claimed in claim 13 including the steps of filling the bottom of said receptacle with water,
   heating and evaporating said water into water vapor by said light source, and
   directing said water vapor to envelop said object which is in the form of a plant requiring a hot humid atmosphere.

* * * * *